US012619261B2

(12) United States Patent　　　　(10) Patent No.:　US 12,619,261 B2
Mukai et al.　　　　　　　　　　　(45) Date of Patent:　　May 5, 2026

(54) CONTROL DEVICE, CONTROL METHOD, AND STORAGE MEDIUM CONTROLLING A MODULE TO DELIVER A PRODUCT TO A USER IN A TRAVELLING MOVING BODY

(71) Applicant: TOYOTA BOSHOKU KABUSHIKI KAISHA, Aichi (JP)

(72) Inventors: Rina Mukai, Aichi (JP); Tokuyuki Nishikawa, Aichi (JP); Richard Chung, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 142 days.

(21) Appl. No.: 18/636,581

(22) Filed: Apr. 16, 2024

(65) Prior Publication Data

US 2024/0427351 A1　　Dec. 26, 2024

(30) Foreign Application Priority Data

Jun. 20, 2023　(JP) ................................. 2023-100998

(51) Int. Cl.
　G05D 1/667　　(2024.01)
　G05D 1/683　　(2024.01)
　G05D 105/00　　(2024.01)
　G05D 105/28　　(2024.01)
　G05D 109/25　　(2024.01)

(52) U.S. Cl.
　CPC ............. G05D 1/667 (2024.01); G05D 1/683 (2024.01); *G05D 2105/14* (2024.01); *G05D 2105/28* (2024.01); *G05D 2109/254* (2024.01)

(58) Field of Classification Search
　CPC .. G05D 1/667; G05D 1/683; G05D 2109/254; G05D 2105/14; G05D 2105/28
　See application file for complete search history.

(56) References Cited

U.S. PATENT DOCUMENTS

| 9,792,576 | B1 * | 10/2017 | Jamjoom | ................. | G06F 16/00 |
| 9,828,092 | B1 * | 11/2017 | Navot | .................... | B64U 10/14 |
| 10,867,277 | B2 * | 12/2020 | Gabbai | .............. | G06Q 10/0836 |
| 11,514,803 | B2 * | 11/2022 | Miller | .................... | G01C 21/20 |
| 11,783,283 | B2 * | 10/2023 | Gabbai | .................... | G08G 5/55 |
| | | | | | 705/338 |
| 2016/0068264 | A1 * | 3/2016 | Ganesh | .................... | G08G 5/55 |
| | | | | | 701/4 |
| 2017/0011340 | A1 * | 1/2017 | Gabbai | .................. | G05D 1/667 |
| 2017/0018041 | A1 * | 1/2017 | Fox | .................... | G06Q 20/3224 |
| 2018/0101173 | A1 * | 4/2018 | Banerjee | ................. | G08G 5/80 |
| 2019/0043370 | A1 * | 2/2019 | Mulhall | .................. | G08G 5/26 |
| 2020/0286392 | A1 * | 9/2020 | Miller | .................... | G01S 19/42 |
| 2021/0109546 | A1 * | 4/2021 | Christiana | ............ | G05D 1/0684 |

FOREIGN PATENT DOCUMENTS

JP　　　　2021-195112　　　12/2021

* cited by examiner

*Primary Examiner* — Ramsey Refai
(74) *Attorney, Agent, or Firm* — Greenblum & Bernstein, P.L.C.

(57)　　　　　ABSTRACT

A control device provided in a vehicle allows reception of a load carried by a drone, determines a position of a user who has ordered the load, and causes a ceiling module to move to the determined position while the vehicle is traveling toward a destination.

8 Claims, 11 Drawing Sheets

20
FIRST MANAGEMENT SERVER

COMMUNICATION I/F — 21

CPU — 22

MEMORY — 23

STORAGE DEVICE — 24

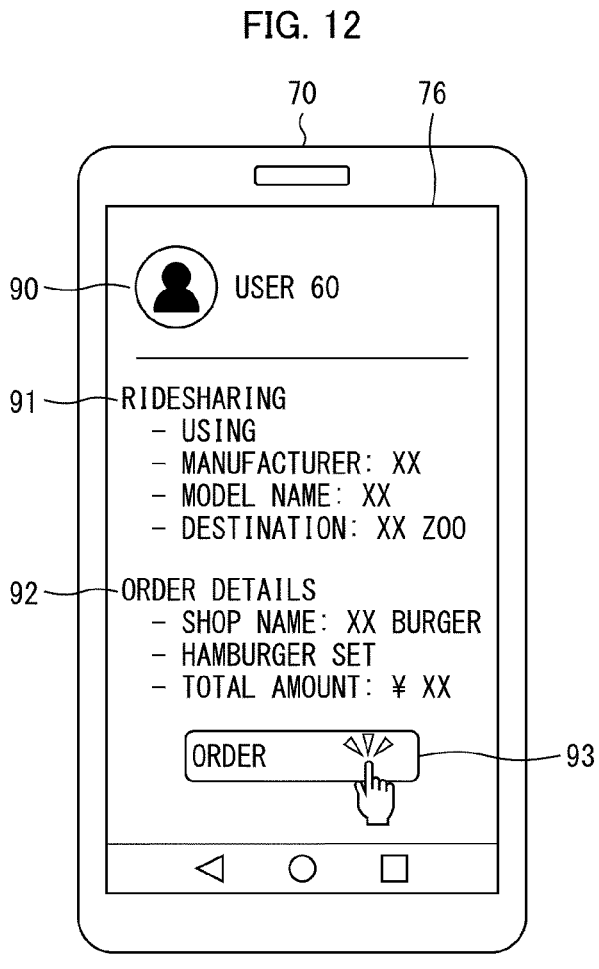

90 — USER 60

91 — RIDESHARING
  - USING
  - MANUFACTURER: XX
  - MODEL NAME: XX
  - DESTINATION: XX ZOO

92 — ORDER DETAILS
  - SHOP NAME: XX BURGER
  - HAMBURGER SET
  - TOTAL AMOUNT: ¥ XX

ORDER — 93

FIG. 13

|     | TARGET TO BE DETECTED/OBTAINED | DETECTION/OBTAINING METHOD |
| --- | --- | --- |
| (1) | GESTURE | CAMERA |
| (2) | SOUND | MICROPHONE |
| (3) | BUTTON OPERATION | SIGNAL FROM BUTTON |
| (4) | SEAT NUMBER | ORDER INFORMATION |
| (5) | ORDER SCREEN | CAMERA |
| (6) | SEAT POSITION | BLUETOOTH (REGISTERED TRADEMARK) |

CONTROL DEVICE, CONTROL METHOD, AND STORAGE MEDIUM CONTROLLING A MODULE TO DELIVER A PRODUCT TO A USER IN A TRAVELLING MOVING BODY

This Nonprovisional application claims priority under 35 U.S.C. § 119 on Patent Application No. 2023-100998 filed in Japan on Jun. 20, 2023, the entire contents of which are hereby incorporated by reference.

TECHNICAL FIELD

The present disclosure relates to a control device, a control method, and a storage medium.

BACKGROUND ART

Patent Literature 1 discloses a technique of opening a roof of a vehicle and receiving, from a drone, a load which is a product.

CITATION LIST

Patent Literature

[Patent Literature 1]
Japanese Patent Application Publication, Tokukai, No. 2021-195112

SUMMARY OF INVENTION

Technical Problem

However, the invention disclosed in Patent Literature 1 merely receives the load from the drone, and cannot deliver the received load to a user.

An aspect of the present disclosure has an object to deliver a product to a user.

Solution to Problem

In order to solve the above problem, a control device in accordance with an aspect of the present disclosure is a control device that controls a module which is provided to a moving body and which is movable in an inside of the moving body, the control device including: a controller, the controller determining, on a basis of given information, a position of a user relating to a product placed on the module, the controller causing the module to move to the determined position.

In order to solve the above problem, a control method in accordance with an aspect of the present disclosure is a control method used for a control device that controls a module which is provided to a moving body and which is movable in an inside of the moving body, the control method including the steps of: determining, on a basis of given information, a position of a user relating to a product placed on the module; and causing the module to move to the determined position.

In order to solve the above problem, a storage medium in accordance with an aspect of the present disclosure is a computer-readable storage medium having a control program stored therein, the control program causing a computer to execute: a process of determining, on a basis of given information, a position of a user relating to a product placed on a module which is provided to a moving body and which is movable in an inside of the moving body; and a process of causing the module to move to the determined position.

A control device in accordance with an aspect of the present disclosure can be realized by a computer. In this case, the present disclosure encompasses: a control program for causing a computer to function as each of the sections (software elements) included in the control device so as to realize the control device by the computer; and a computer-readable storage medium having the control program stored therein.

Advantageous Effects of Invention

According to an aspect of the present disclosure, it is possible to deliver a product to a user.

BRIEF DESCRIPTION OF DRAWINGS

FIG. 1 is a view schematically illustrating a configuration of an example of a delivery management system in accordance with an embodiment of the present disclosure.

FIG. 3 is a view illustrating an example of a method for receiving a load from a drone and a method for delivering the load to a user.

FIG. 4 is a block diagram illustrating a hardware configuration of a first management server.

FIG. 5 is a block diagram illustrating a hardware configuration of a second management server.

FIG. 12 shows an example of an order screen via which a user orders a product.

FIG. 13 is a view illustrating an example of a method for determining a position of a user who has ordered a product.

DESCRIPTION OF EMBODIMENTS

First Embodiment

Figure 2:
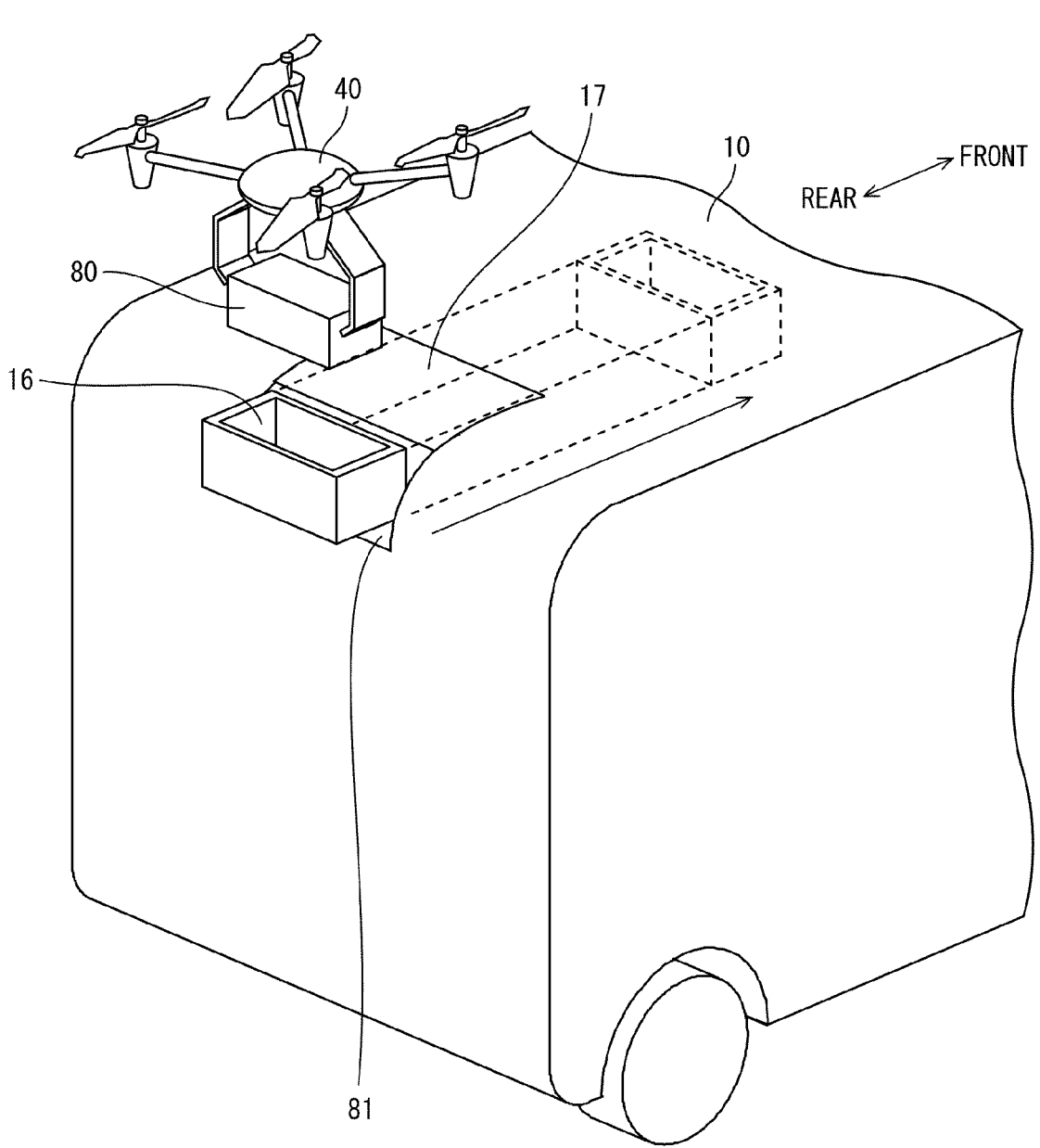
FIG. 2 is a view illustrating an example of a method for receiving a load from a drone and a method for delivering the load to a user.

The following description will discuss, with reference to the drawings, details of a delivery management system 100 in accordance with a first embodiment of the present disclosure. The same parts in the drawings are given the same reference numerals, and descriptions thereof will be omitted.
(Configuration of Delivery Management System 100)

Figure 1:
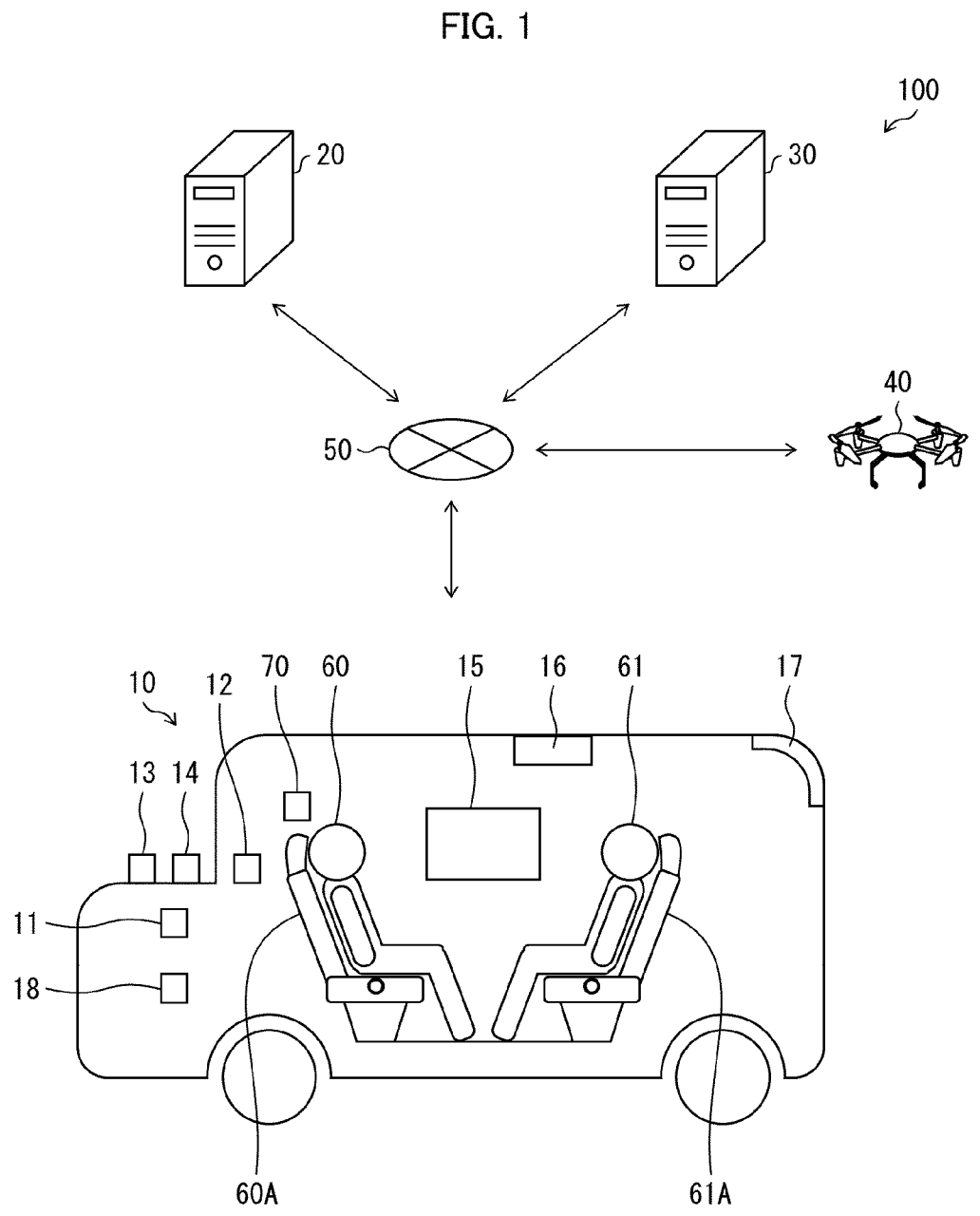

The delivery management system 100 is a system with which a product ordered by a user who is in a vehicle is delivered to the user with use of a drone and a ceiling module provided to the vehicle. FIG. 1 is a view schematically illustrating a configuration of an example of the delivery management system 100.

As shown in FIG. 1, the delivery management system 100 includes: a vehicle 10 used in a ridesharing service; a first management server 20 managed and operated by a business operator of the ridesharing service; a second management server 30 managed and operated by a business operator of a food delivery service; a drone 40 that is a flying moving body; a communication network 50; and a user terminal 70 owned by a user 60 who is in the vehicle 10.

In FIG. 1, a single vehicle 10 is shown. However, this is not limitative. Alternatively, the delivery management system 100 may include two or more vehicles. Further, in FIG. 1, a single drone 40 is shown. However, this is not limitative. Alternatively, the delivery management system 100 may include two or more drones. Moreover, in FIG. 1, a single user terminal 70 is shown. However, this is not limitative. Alternatively, the delivery management system 100 may include two or more user terminals. For example, the delivery management system 100 may include, in addition to the user terminal 70 owned by the user 60, a user terminal owned by a user 61. In a case where the business operator managing the ridesharing service and the business operator managing the food delivery service are the same, the first management server 20 and the second management server 30 may be a single server. The service provided by the business operator managing and operating the second management server 30 is not limited to the food delivery service, but may be a delivery service for daily necessities, medical and pharmaceutical products, and/or the like.

Each of the vehicle 10 and the drone 40 includes a control device (described later). The control device of the vehicle 10, the first management server 20, the second management server 30, the control device of the drone 40, and the user terminal 70 are communicable with each other via the communication network 50.

In the present embodiment, the vehicle 10 is described as a vehicle used in the ridesharing service. However, this is not limitative. Alternatively, the vehicle 10 may be a vehicle for private use. In the present embodiment, the vehicle 10 is described as a vehicle having an autonomous driving function. It is assumed that the autonomous driving function of the vehicle 10 does not require monitoring by a passenger. That is, an assumed level of autonomous driving thereof is 3 or higher. However, this is not limitative. The vehicle 10 may be a vehicle not having an autonomous driving function. Two users, that is, the user 60 and the user 61 are in the vehicle 10. Alternatively, three or more users may be in the vehicle 10.

The vehicle 10 includes a control device 11, a GPS receiver 12, a camera 13, a sensor set 14, a display 15, a ceiling module 16, an opening/closing device 17, an actuator 18, a first-row seat 60A, and a second-row seat 61A.

The control device 11 controls the actuator 18 according to information obtained from the GPS receiver 12, the camera 13, and the sensor set 14 so as to realize autonomous driving. The actuator 18 includes a brake actuator, an accelerator pedal actuator, a steering actuator, and the like. The control device 11 has a function to (i) control actions of the ceiling module 16 and the opening/closing device 17 so as to receive a load from the drone 40 and (ii) deliver the received load to the user 60.

The GPS receiver 12 receives a radio wave from an artificial satellite so as to obtain position information of the vehicle 10 on the earth. The position information of the vehicle 10 obtained by the GPS receiver 12 is transmitted to the control device 11.

The camera 13 includes an image capturing element such as a charge-coupled device (CCD) and/or a complementary metal oxide semiconductor (CMOS). The number of cameras 13 and the position(s) of the camera(s) 13 are not particularly limited. For example, the cameras 13 are provided at a front position, a side position, and a rear position of the vehicle 10. The camera 13 captures an image of an area surrounding the vehicle 10 at a given cycle to detect information on the area surrounding the vehicle 10. The information on the area surrounding the vehicle 10 includes information relating to a moving object(s) such as a pedestrian, a bicycle, a motorcycle, another vehicle, and/or the like and information relating to a stationary object(s) such as a carriageway marking, a signal, a sign, a pedestrian crossing, an intersection, and/or the like. The information on the area surrounding the vehicle 10, detected by the camera 13, is transmitted to the control device 11.

The sensor set 14 includes a sensor for detecting a state of the vehicle 10 and a sensor for detecting the information on the area surrounding the vehicle 10. Examples of the sensor for detecting the state of the vehicle 10 include a speed sensor, an acceleration sensor, a steering sensor, a gyro sensor, a brake hydraulic sensor, and an accelerator angle sensor. Examples of the sensor for detecting the information on the area surrounding the vehicle 10 include a millimeter wave radar and a Light Detection and Ranging (LiDAR). LIDAR is a sensor that measures a period of time it takes for laser light emitted to an object in the area surrounding the vehicle 10 to reach and return from the object, thereby measuring a distance and a direction to the object and/or recognizing a shape of the object. The state of the vehicle 10 and the information on the area surrounding the vehicle 10 detected by the sensor set 14 are transmitted to the control device 11.

The display 15 is a device that displays various information.

The ceiling module 16 is provided to a ceiling of the vehicle. Specifically, the ceiling module 16 is a module movable in the vehicle along a rail (not illustrated) provided to the ceiling of the vehicle. The "module" herein means a part having a given function.

The opening/closing device 17 is a module that is provided to a part of the roof of the vehicle 10 and that is capable of opening and closing an opening in a part of the roof. In an example shown in the present embodiment, the opening/closing device 17 is provided at a rear end of the roof. Alternatively, the opening/closing device 17 may be provided at a center or a front end of the roof.

The seat 60A on which the user 60 sits is a turnable seat. In FIG. 1, the seat 60A faces a rear side. Thus, the user 60 sitting on the seat 60A and the user 61 sitting on the seat 61A face each other.

The communication network 50 described here is the Internet. However, this is not limitative. Alternatively, the communication network 50 may be any of the other radio communication networks.

(Method for Receiving Load from Drone 40 and Method for Delivering Load to User 60)

Figures 3, 4:
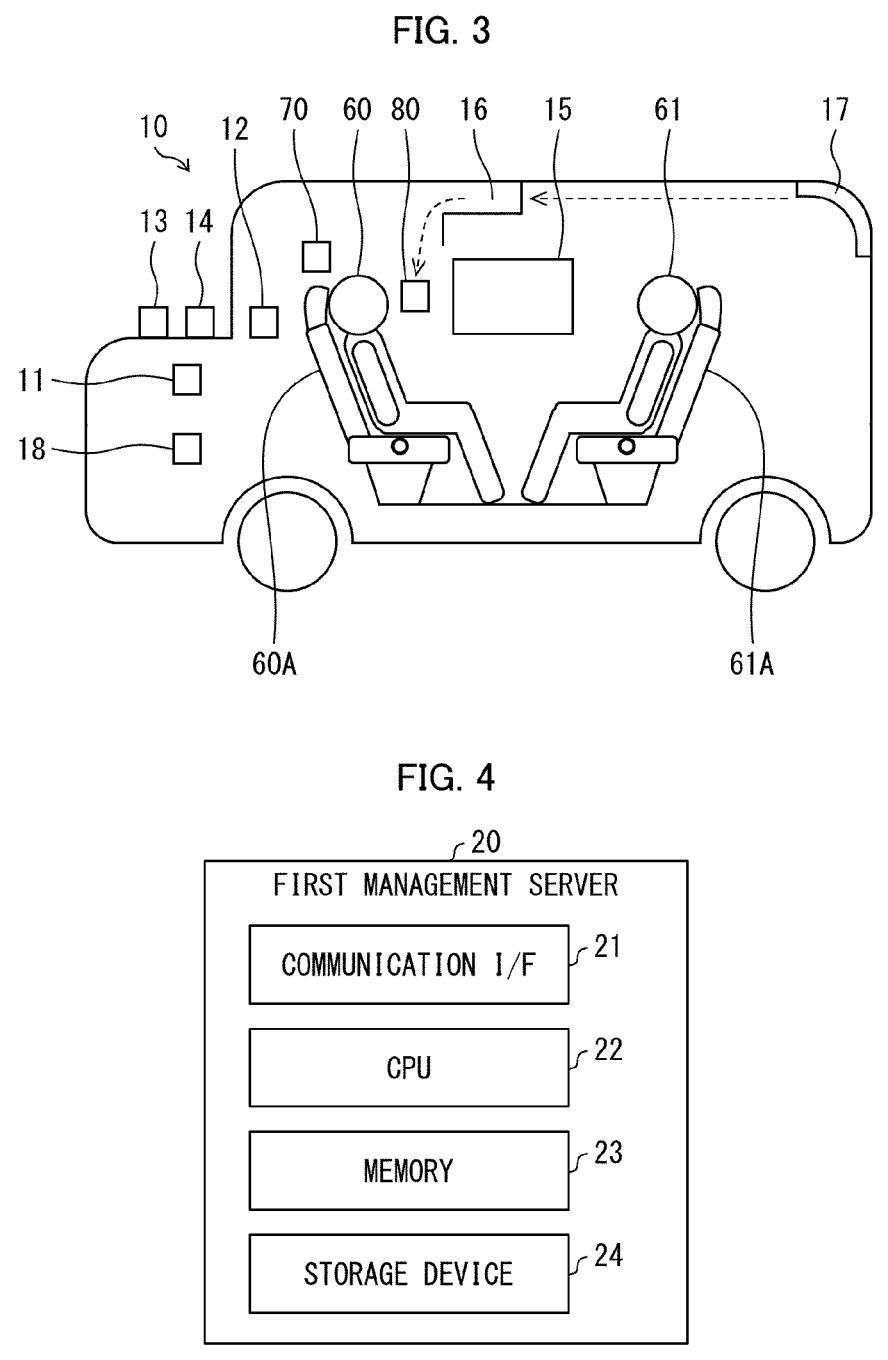

Next, the following description will discuss, with reference to FIGS. 2 and 3, an example of a method for receiving a load 80 from the drone 40 and a method for delivering the load 80 to the user 60. Each of FIGS. 2 and 3 shows a scene in which the ceiling module 16 of the vehicle 10 receives the load 80 carried by the drone 40 and delivers the received load 80 to the user 60 (not illustrated in FIG. 2). The load 80 is a product that the user 60 who is traveling in the vehicle 10 has ordered with the user terminal 70 via the Internet.

Upon detection of arrival of the load 80, the control device 11 of the vehicle 10 causes the opening/closing device 17 to slide toward the front side of the vehicle 10 so as to open the opening 81, which is a part of the roof.

The control device 11 of the vehicle 10 causes the ceiling module 16 to move from the opening 81 toward the outside of the vehicle 10. The ceiling module 16 has a rectangular parallelepiped box shape and has an opened upper side. This allows the load 80 to be placed in the ceiling module 16 through the upper side of the ceiling module 16. After placing the load 80 in the ceiling module 16, the drone 40 opens its arms with which the load 80 was held. Delivering the load 80 in this manner prevents falling of the load 80, thereby preventing a damage of the load 80.

After the load 80 is placed in the ceiling module 16, the control device 11 of the vehicle 10 causes the ceiling module 16 to move in the manner shown in FIG. 3, so as to convey the load 80 to a position of the user 60. In this manner, the load 80 can be delivered to the user 60.

The present embodiment assumes that the series of the process in which the user 60 who is traveling in the vehicle 10 orders a product via the Internet, the process of receiving the ordered product (load 80) from the drone 40, and the process of delivering the product to the user 60 is carried out while the vehicle 10 is traveling toward a destination.

(Hardware Configuration of First Management Server 20)

Next, the following description discuss, with, reference to FIG. 4, an example of a hardware configuration of the first management server 20. FIG. 4 is a block diagram illustrating the hardware configuration of the first management server 20.

As shown in FIG. 4, the first management server 20 is a general-purpose computer including a communication interface (I/F) 21, a Central Processing Unit (CPU) 22, a memory 23, and a storage device 24. These constituent elements are electrically connected to each other via a bus (not illustrated).

The communication I/F 21 is implemented as hardware such as a network adapter, various communication software, or a combination of them, and is configured to realize radio communication carried out via the communication network 50.

The CPU 22 is a central processing unit and executes various programs. The memory 23 is a storage medium such as a Read Only Memory (ROM) or a Random Access Memory (RAM). The storage device 24 is constituted by a Hard Disk Drive (HDD), a Solid State Drive (SSD) a flash memory, or the like, and has various programs or various data stored therein. Specifically, in the storage device 24, account information (e.g., a user ID and/or a password) for utilizing the ridesharing service, use history, and/or the like is/are stored. The CPU 22 reads out and executes a program stored in the memory 23.

(Hardware Configuration of Second Management Server 30)

Figure 5:
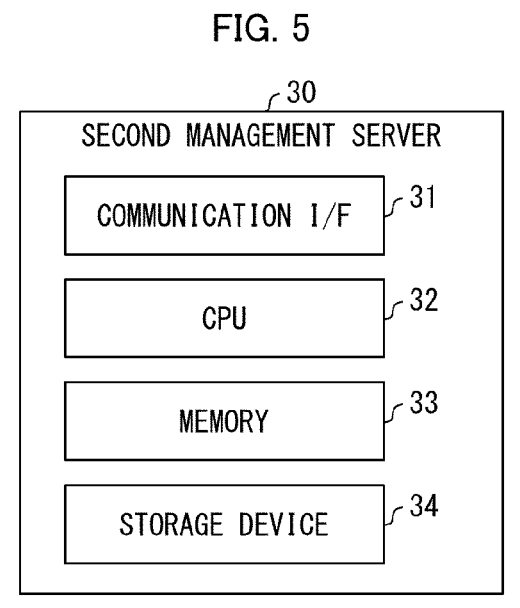

Next, the following description discuss, with reference to FIG. 5, an example of a hardware configuration of the second management server 30. FIG. 5 is a block diagram illustrating the hardware configuration of the second management server 30.

As shown in FIG. 5, the second management server 30 is a general-purpose computer including a communication interface (I/F) 31, a CPU 32, a memory 33, and a storage device 34. These constituent elements are electrically connected to each other via a bus (not illustrated). Configurations of the communication I/F 31, the CPU 32, the memory 33, and the storage device 34 are identical to those of the communication I/F 21, the CPU 22, the memory 23, and the storage device 24 of the first management server 20 described above. Therefore, descriptions thereof will be omitted.

In the storage device 34, account information (e.g., a user ID and/or a password) for utilizing the food delivery service, a store(s) registered in the food delivery service, a menu(s) provided by the store(s), and/or the like is/are stored.

(Hardware Configuration of Control Device 11 of Vehicle 10)

Figure 6:
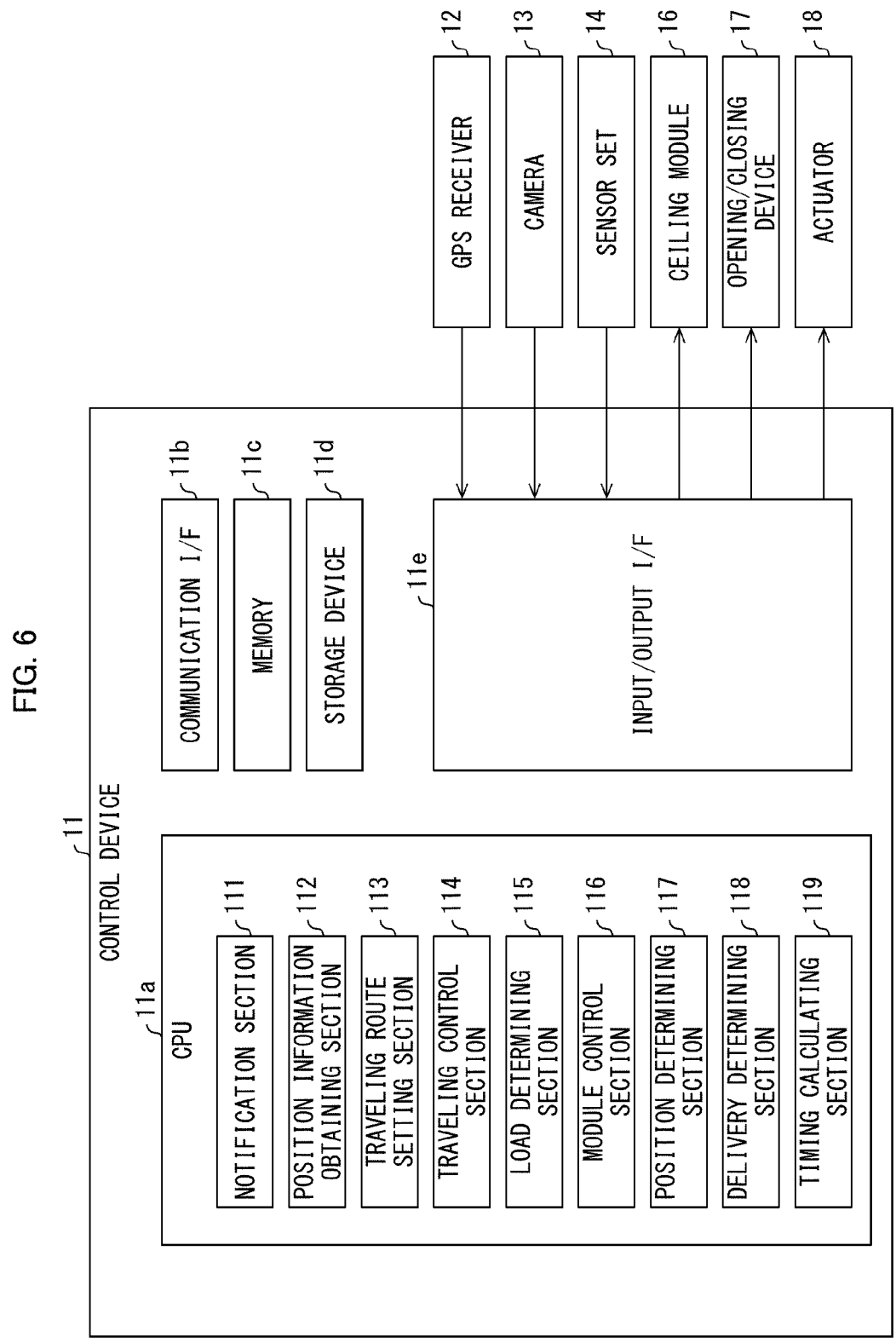
FIG. 6 is a block diagram illustrating a hardware configuration of a control device of a vehicle.

Next, the following description will discuss, with reference to FIG. 6, an example of a hardware configuration of the control device 11 of the vehicle 10. FIG. 6 is a block diagram illustrating a hardware configuration of the control device 11 of the vehicle 10.

As shown in FIG. 6, the control device 11 of the vehicle 10 is a general-purpose computer including a communication I/F 11b, a CPU 11a, a memory 11c, a storage device 11d, and an input/output I/F 11e. These constituent elements are electrically connected to each other via a bus (not illustrated). Configurations of the communication I/F 11b, the CPU 11a, the memory 11c, and the storage device 11d are identical to those of the communication I/F 21, the CPU 22, the memory 23, and the storage device 24 of the first management server 20 described above. Therefore, descriptions thereof will be omitted.

The input/output I/F 11e is an interface used to communicate with the GPS receiver 12, the camera 13, the sensor set 14, the ceiling module 16, the opening/closing device 17, and the actuator 18 mounted on the vehicle 10. This interface may be the one employing a communication standard which is in compliance with a controller area network (CAN) protocol, for example.

In the control device 11 of the present embodiment, the CPU 11a executes a given program stored in the storage device 11d to function as a notification section 111, a position information obtaining section 112, a traveling route setting section 113, a traveling control section 114, a load determining section 115, a module control section 116, a position determining section 117, a delivery determining section 118, and a timing calculating section 119.

The notification section 111 notifies given information to the drone 40 or the user 60. The position information obtaining section 112 obtains position information from the GPS receiver 12, and outputs the obtained position information to the traveling control section 114.

The traveling route setting section 113 sets a traveling route to a destination desired by the user 60, and outputs the set traveling route to the traveling control section 114. The traveling control section 114 controls the actuator 18 so as to cause the vehicle 10 to travel along the traveling route obtained from the traveling route setting section 113.

The load determining section 115 determines whether or not the load 80 carried by the drone 40 is the product ordered by the user 60. The module control section 116 controls operation of the ceiling module 16 and the opening/closing device 17.

The position determining section 117 determines a position of the user 60 who has ordered the load 80. The delivery determining section 118 determines whether or not delivery of the load 80 to the user 60 is possible. In a case where the delivery determining section 118 determines that delivery of the load 80 is impossible, the timing calculating section 119 calculates a timing suitable for delivery of the load 80.

(Hardware Configuration of User Terminal 70)

Figure 7:
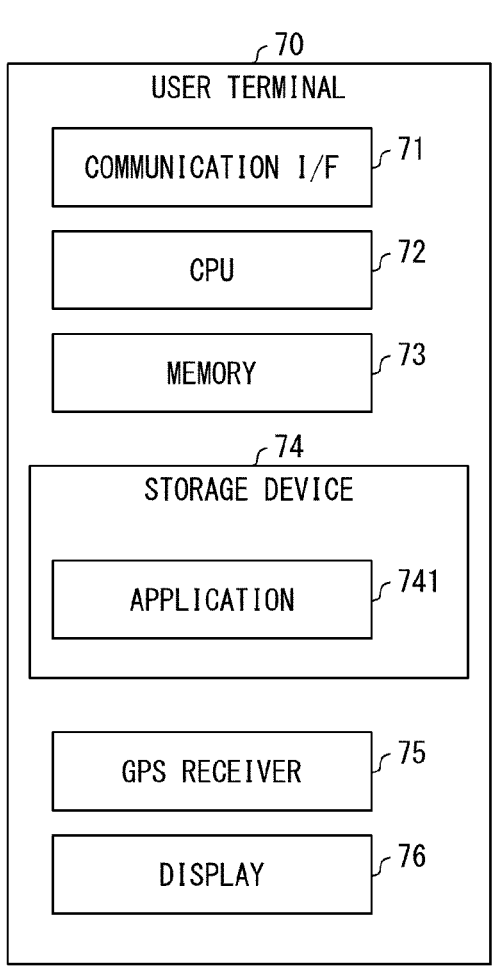
FIG. 7 is a block diagram illustrating a hardware configuration of a user terminal.

Next, the following description discuss, with reference to FIG. 7, an example of a hardware configuration of the user terminal 70. FIG. 7 is a block diagram illustrating the hardware configuration of the user terminal 70.

The user terminal 70 is a device owned by the user 60 who is in the vehicle 10 and uses the ridesharing service. The present embodiment assumes that the user terminal 70 is a smartphone. However, this is not limitative. The user terminal 70 may be a tablet terminal or a wearable device.

As shown in FIG. 7, the user terminal 70 includes a communication I/F 71, a CPU 72, a memory 73, a storage device 74, a GPS receiver 75, and a display 76. These elements are electrically connected to each other via a bus (not illustrated). Configurations of the communication I/F 71, the CPU 72, the memory 73, and the storage device 74 are identical to those of the communication I/F 21, the CPU 22, the memory 23, and the storage device 24 of the first management server 20 described above. Therefore, descriptions thereof will be omitted.

In the storage device 74, an application 741 for utilizing the ridesharing service and the food delivery service is installed. Hereinafter, the above application 741 will be simply referred to as an "application 741". The application 741 is realized by the CPU 72 reading out a dedicated application program from the storage device 74 and executing the application program.

The display 76 is constituted by, e.g., a liquid crystal display or an organic electroluminescent (EL) display, and displays various information. The display 76 has a capacitive type touch sensor, and also functions as an input device that accepts a touch operation of the user 60 as an input operation.

(Drone 40)

Figure 8:
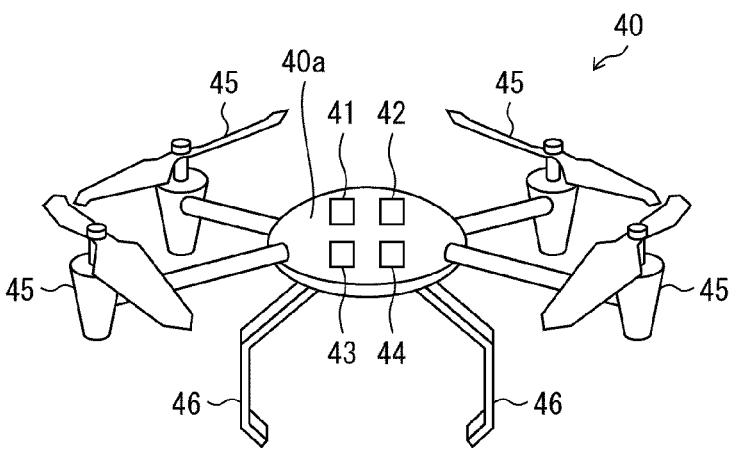
FIG. 8 is a view illustrating an appearance of a drone.

Next, the following description will discuss the drone 40 with reference to FIG. 8. FIG. 8 is a view illustrating an appearance of the drone 40.

As shown in FIG. 8, the drone 40 includes a main body 40a, four propellers 45 connected to the main body 40a, and a single set of arms 46 connected to the main body 40a. The main body 40a includes a control device 41, a GPS receiver 42, a camera 43, and a sensor set 44. Note that the number of propellers is not limited to four. The number of propellers may be any number, provided that it can realize stable flight. The number of sets of arms may be two or more.

The GPS receiver 42 obtains position information of the drone 40 by receiving a radio wave from an artificial satellite. The position information of the drone 40 obtained by the GPS receiver 42 is transmitted to the control device 41.

The camera 43 includes an image capturing element such as a charge-coupled device (CCD) and/or a complementary metal oxide semiconductor (CMOS). The camera 43 captures an image of an area surrounding the drone 40 at a given cycle to detect information on the area surrounding the drone 40. The information on the area surrounding the drone 40 includes, for example, weather and/or brightness of the area surrounding the drone 40 and/or an obstacle(s) such as a tree and/or a bird existing in front of the drone 40. The information on the area surrounding the drone 40 detected by the camera 43 is transmitted to the control device 41.

The sensor set 44 includes a sensor for detecting a state of the drone 40 and a sensor for detecting the information on the area surrounding the drone 40. Examples of the sensor for detecting the state of the drone 40 include a speed sensor, an accelerator sensor, and a gyro sensor. Examples of the sensor for detecting the information on the area surrounding the drone 40 include an ultrasonic sensor and an atmospheric pressure sensor. The state of the drone 40 and the information on the area surrounding the drone 40 detected by the sensor set 44 are transmitted to the control device 41.

The control device 41 controls the propellers 45 on the basis of the information obtained from the GPS receiver 42, the camera 43, and the sensor set 44 so as to cause the drone 40 to fly.

(Hardware Configuration of Control Device 41 of Drone 40)

Figure 9:
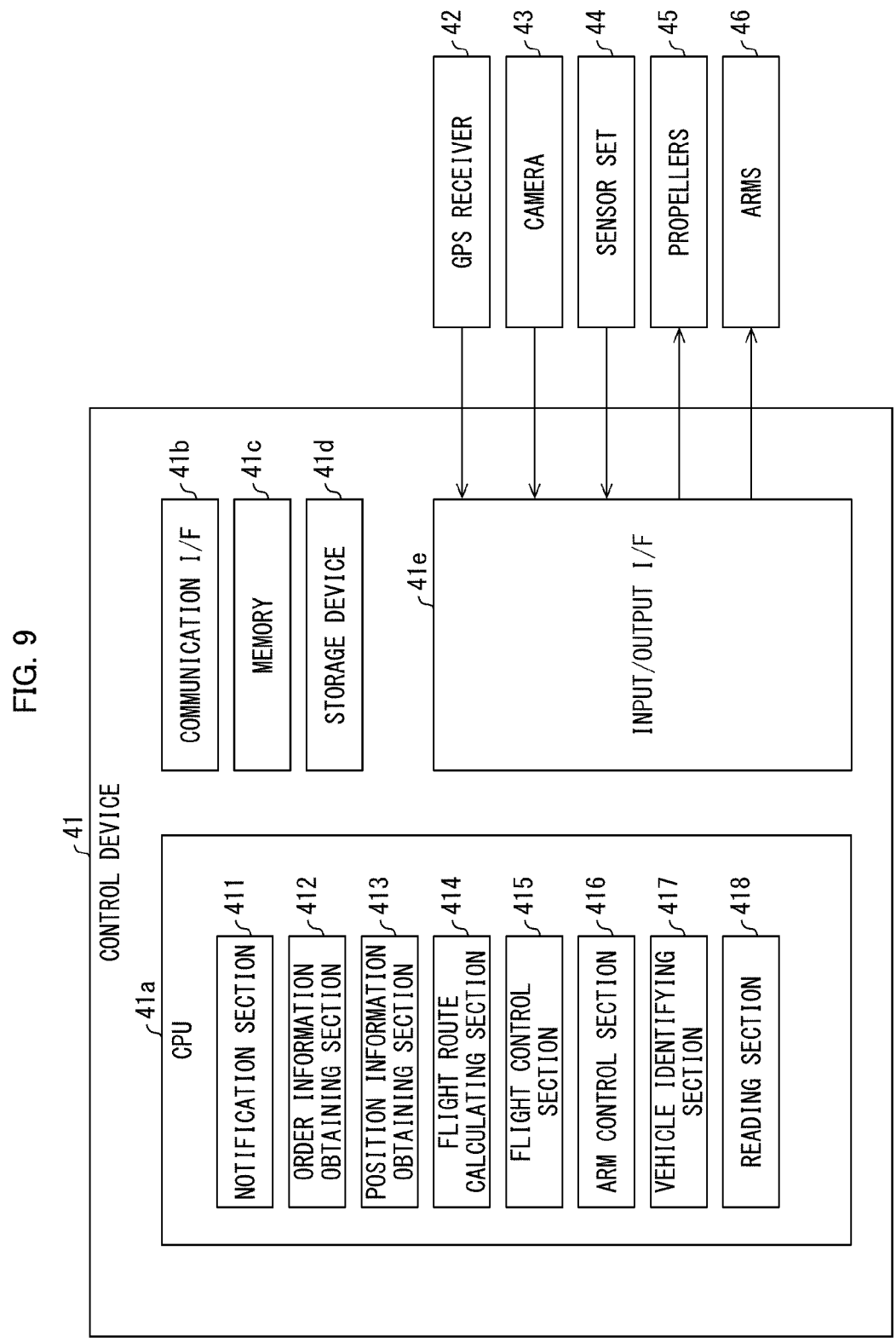
FIG. 9 is a block diagram illustrating a hardware configuration of a control device of the drone.

Next, the following description will discuss, with reference to FIG. 9, an example of a hardware configuration of the control device 41 of the drone 40. FIG. 9 is a block diagram illustrating a hardware configuration of the control device 41 of the drone 40.

As shown in FIG. 9, the control device 41 of the drone 40 is a general-purpose computer including a communication I/F 41b, a CPU 41a, a memory 41c, a storage device 41d, and an input/output I/F 41e. These constituent elements are electrically connected to each other via a bus (not illustrated). Configurations of the communication I/F 41b, the CPU 41a, the memory 41c, and the storage device 41d are identical to those of the communication I/F 21, the CPU 22, the memory 23, and the storage device 24 of the first management server 20 described above. Therefore, descriptions thereof will be omitted.

The input/output I/F 41e is an interface used to communicate with the GPS receiver 42, the camera 43, the sensor set 44, the propellers 45, and the arms 46 mounted on the drone 40.

In the control device 41 of the present embodiment, the CPU 41a executes a given program stored in the storage device 41d to function as a notification section 411, an order information obtaining section 412, a position information obtaining section 413, a flight route calculating section 414, a flight control section 415, an arm control section 416, a vehicle identifying section 417, and a reading section 418.

The notification section 411 notifies given information to the vehicle 10 or the user 60. The order information obtaining section 412 obtains, from the second management server 30, information relating to an order made by the user 60.

The position information obtaining section 413 obtains position information from the GPS receiver 42, and outputs the obtained position information to the flight control section 415. The flight route calculating section 414 calculates a flight route to the vehicle 10, and outputs the calculated flight route to the flight control section 415. Considering an environment around the drone 40, the flight control section 415 causes the drone 40 to fly along the flight route calculated by the flight route calculating section 414.

The arm control section 416 controls the arms 46 so as to cause the arms 46 to grasp the load 80. The vehicle identifying section 417 identifies, through known image analysis such as pattern matching, the vehicle 10 to which the load 80 is to be delivered. The reading section 418 reads, by the camera 43, a Quick Response (QR) code (registered trademark) attached to the vehicle 10 to obtain information embedded in the QR code (registered trademark).

(Flow of Process Executed by Delivery Management System 100)

Figure 10:
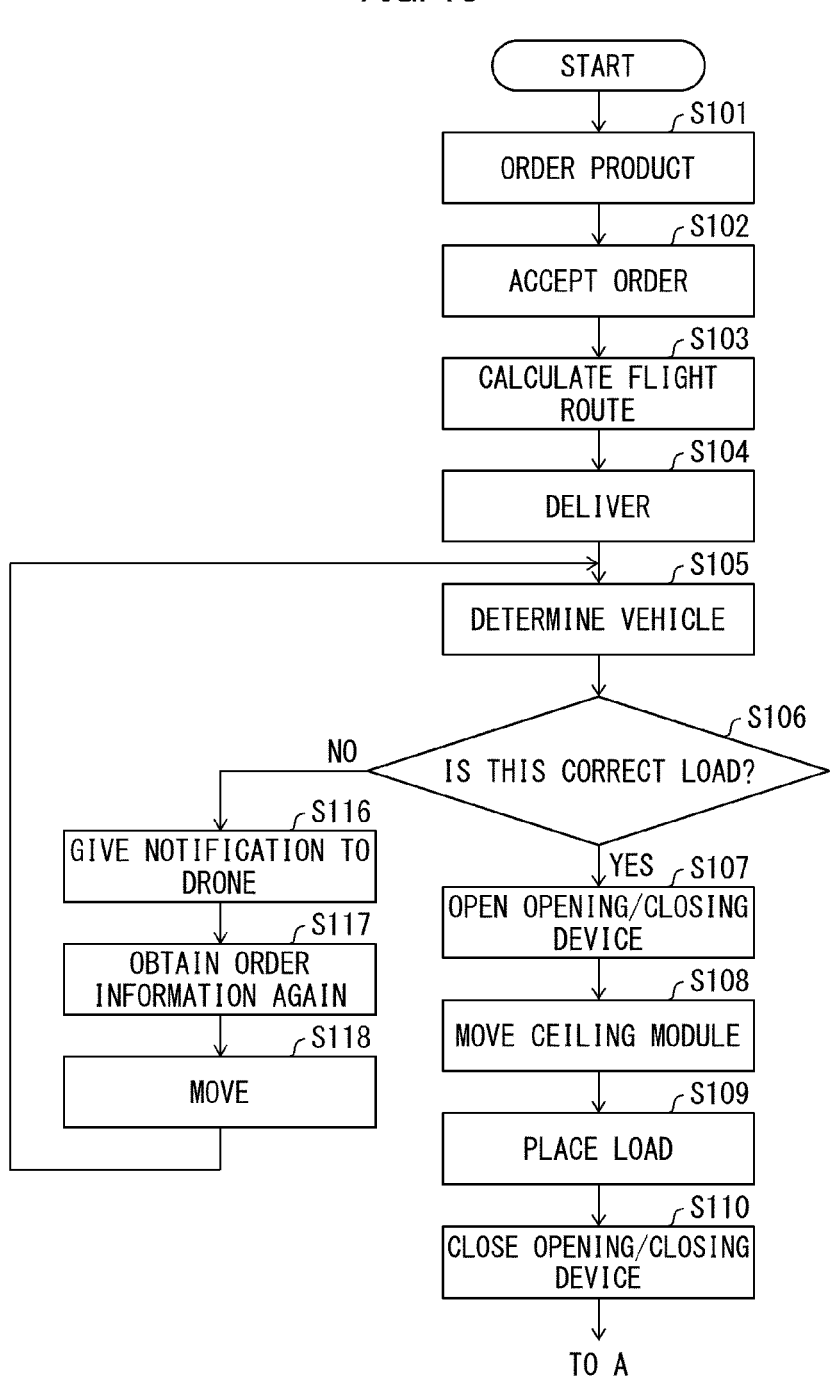
FIG. 10 is a flowchart of a process of a delivery management system.
Figure 11:
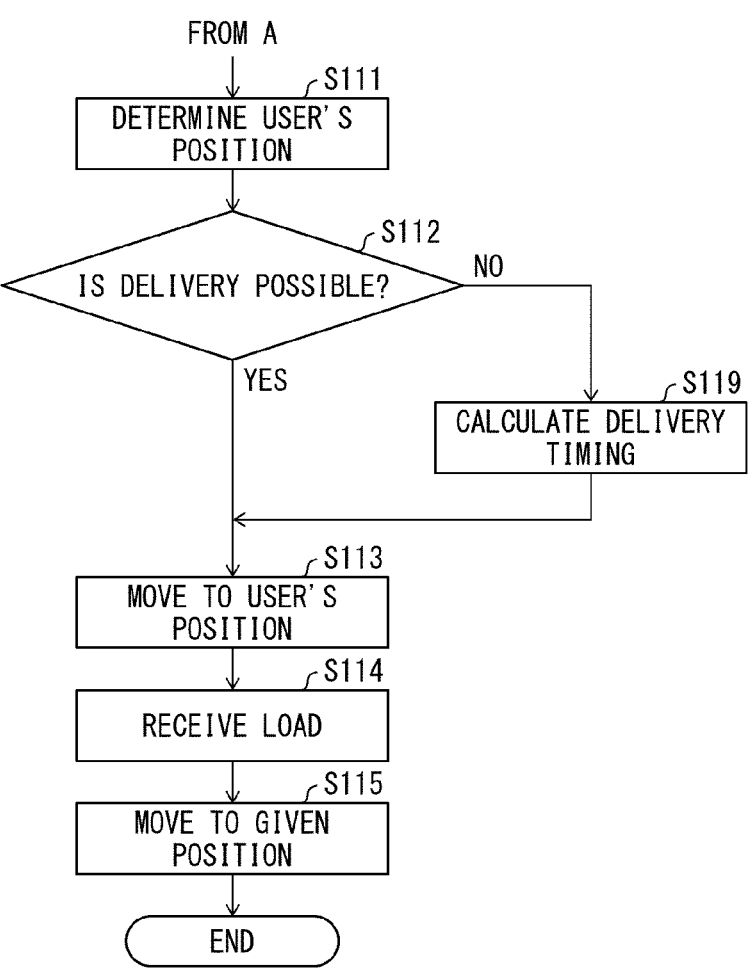
FIG. 11 is a flowchart of a process of the delivery management system.

Next, the following description will discuss, with reference to flowcharts shown in FIGS. 10 and 11, an example of a process executed by the delivery management system 100. The processes in the flowcharts are executed, for example, in a scene in which a product ordered by the user 60 who is traveling in the vehicle 10 is delivered to the vehicle 10 by the drone 40 and the product received from the drone 40 is delivered to the user 60.

In step S101, the user 60 who is traveling in the vehicle 10 uses an application 741 to (i) select a desired store from among available stores and to (ii) choose and order desired food and/or drink from a menu provided by the store. The information relating to the store selected by the user 60 and the order from the menu is transmitted to the first management server 20.

In step S102, the first management server 20 obtains the information relating to the order transmitted in the process in step S101 so as to accept the order made by the user 60. In the present embodiment, the business operator operating the ridesharing service and the business operator operating the food delivery service are in corporation with each other, and thus can share the information of the user 60 who utilizes the ridesharing service and the food delivery service. Specifically, the first management server 20 can share with the second management server 30 in information relating to the ridesharing service. Examples of such information include: (1) information indicating whether or not the user 60 is utilizing the ridesharing service; (2) information indicating a manufacturer of a vehicle on which the user rides (if the user is utilizing the ridesharing service); (3) information indicating a place where the vehicle is currently traveling; and (4) information indicating a destination.

Here, the following description will discuss, with reference to FIG. 12, an example of an order screen via which the user 60 orders food and/or drink. The order function is a function provided by the application 741, and an order is made via the application 741. As shown in FIG. 12, when the user 60 is ordering food and drink, the display 76 of the user terminal 70 displays an icon 90 indicating that the user 60 is currently logging in the application 741, a notification 91 indicating whether or not the user 60 is currently utilizing the ridesharing service, and a notification 92 relating to a content of the order.

As shown in the notification 91, the display 76 displays information indicating that the user 60 is currently utilizing the ridesharing service, a manufacturer name and a model name of the vehicle 10 on which the user 60 rides, and a destination. The information relating to the notification 91, that is, the information relating to the ridesharing service is information transmitted from the first management server 20 to the second management server 30.

Returning to FIG. 10, in step S102, the first management server 20 transmits the information relating to the accepted order and the information relating to the ridesharing service to the second management server 30. The second management server 30 transmits the information relating to the order and the information relating to the ridesharing service to the store selected by the user 60, the control device 41 of the drone 40 provided to that store, and the control device 11 of the vehicle 10. An employee of the store prepares the food and drink ordered by the user 60, and causes the drone 40 to deliver the food and drink.

In step S103, the control device 41 of the drone 40 calculates, on the basis of the information received in the process in step S102, a flight route from the store to the vehicle 10. Specifically, the control device 41 of the drone 40 calculates the flight route from the store to the vehicle 10 by using position information of the vehicle 10 received from the second management server 30.

The process advances to step S104. Then, the control device 41 of the drone 40 causes the drone 40 to fly along the flight route calculated in the process in step S103.

The process advances to step S105. Then, the control device 41 of the drone 40 which has arrived at a delivery point of the load 80 identifies, on the basis of an image captured by the camera 43, the vehicle 10 to which the load 80 is to be delivered. At the delivery point of the load 80, the control device 41 of the drone 40 needs to identify, from among traveling vehicles, the vehicle 10 to which the load 80 is to be delivered.

The following description will discuss an example of a method for identifying the vehicle 10 to which the load 80 is to be delivered. The control device 41 of the drone 40 knows the model name of the vehicle 10 to which the load 80 is to be delivered, since the control device 41 has obtained the model name from the second management server 30 (see FIG. 12). Further, the storage device 41d of the drone 40 stores therein a shape of the vehicle 10. Thus, the control device 41 of the drone 40 can compare, by pattern matching, (i) a shape of a vehicle in the image captured by the camera 43 at the delivery point of the load 80 and (ii) the shape of the vehicle 10 stored in the storage device 41d, thereby identifying, as the vehicle 10 to which the load 80 is to be delivered, a vehicle whose shape matches or substantially matches the shape of the vehicle 10 stored in the storage device 41d.

The process advances to step S106. Then, the control device 41 of the drone 40 causes the camera 43 to capture an image of a QR code (registered trademark) attached to the vehicle 10 identified in the process in step S105, so as to obtain information embedded in the QR code (registered trademark).

The purpose of obtaining the information from the QR code (registered trademark) attached to the vehicle 10 in the process in step S106 is to check whether or not the load 80 carried by the drone 40 is the product ordered by the user 60. The control device 41 of the drone 40 transmits, to the control device 11 of the vehicle 10, the information relating to the ridesharing service obtained from the second management server 30 and the information embedded in the QR code (registered trademark). The "information relating to the ridesharing service" includes the manufacturer name and model name of the vehicle 10 on which the user 60 who has ordered the product of the load 80 rides, as discussed above (see FIG. 12). The "information embedded in the QR code (registered trademark)" is, for example, the manufacturer name and model name of the vehicle 10 to which the QR code (registered trademark) is attached.

The control device 11 of the vehicle 10 compares the information relating to the ridesharing service obtained from the control device 41 of the drone 40 with the information embedded in the QR code (registered trademark); then, if these pieces of information match, the control device 11 of the vehicle 10 determines that the load 80 carried by the drone 40 is the product ordered by the user 60 (YES in step S106). Note that, under the condition that the information relating to the ridesharing service obtained from the control device 41 of the drone 40 matches the information embedded in the QR code (registered trademark), the control device 11 of the vehicle 10 may determine that the load 80 has arrived.

The process in step S106 is effective when two or more vehicles of the same manufacturer and the same model are traveling side by side. In a case where two or more vehicles of the same manufacturer and the same model are traveling side by side, any of these vehicles can be identified, in the process of step S105, as the vehicle to which the load 80 is to be delivered. In this case, there is a possibility that the drone 40 may deliver the load 80 to a vehicle to which the load 80 should not be delivered. In order to deal with this, the present embodiment is configured to check whether or not the load 80 carried by the drone 40 according to the information of the QR code (registered trademark) attached to the vehicle is the product ordered by the user 60. With this, even in a case where two or more vehicles of the same manufacturer and the same model are traveling side by side, it is possible to deliver the load 80 to a vehicle to which the load 80 should be delivered.

Note that the information obtained by the control device 41 of the drone 40 in the process in step S106 is not limited to the information of the QR code (registered trademark), and may be information indicating a number plate, for example. The information obtained by the control device 41 of the drone 40 only needs to be information used to distinguish two or more vehicles of the same manufacturer and the same model from each other when these vehicles are traveling side by side.

If the information relating to the ridesharing service obtained from the control device 41 of the drone 40 does not match the information embedded in the QR code (registered trademark) (NO in step S106), the process advances to step S116. Then, the control device 11 of the vehicle 10 notifies the control device 41 of the drone 40 that the vehicle is not the vehicle to which the load 80 should be delivered.

The process advances to step S117. Then, the control device 41 of the drone 40 obtains again the information relating to the order and the information relating to the ridesharing service from the second management server 30. The process advances to step S118. Then, according to the information obtained in the process in step S117, the control device 41 of the drone 40 causes the drone 40 to move to a position of the vehicle to which the load 80 is to be delivered. Thereafter, the process returns to step S105.

If the determination result in step S106 is "YES", the process advances to step S107. Then, the control device 11 of the vehicle 10 causes the opening/closing device 17 to slide toward the front side of the vehicle 10 so as to open the opening 81, which is a part of the roof (see FIG. 2).

The process advances to step S108. Then, the control device 11 of the vehicle 10 causes the ceiling module 16 to move from the opening 81 toward the outside of the vehicle 10 to reach a position where the load 80 can be placed on the ceiling module 16 (see FIG. 2).

The process advances to step S109. Then, after confirming the movement of the ceiling module 16 with the camera 43, the control device 41 of the drone 40 causes the load 80 to be placed on the ceiling module 16 and opens the arms 46 which have held the load 80. Then, acceptance of the load 80 from the drone 40 is completed. Note that, when the control device 11 of the vehicle 10 has caused the ceiling module 16 to the position where the load 80 can be placed on the ceiling module 16, the control device 11 may notify the drone 40 that the ceiling module 16 has moved. Upon reception of this notification, the control device 41 of the drone 40 may cause the load 80 to be placed on the ceiling module 16.

The process advances to step S110. Then, the control device 11 of the vehicle 10 causes the ceiling module 16 to move to the inside of the vehicle, and causes the opening/closing device 17 to slide toward the rear side of the vehicle 10 so as to close the opening 81.

The process advances to step S111. Then, in order that the load 80 received from the drone 40 is delivered to the user 60, the control device 11 of the vehicle 10 determines a position of the user 60 who has ordered the load 80. The following description will discuss, with reference to FIG. 13, an example of a method for determining the position of the user 60 who has ordered the load 80.

As shown in (1) of FIG. 13, the control device 11 of the vehicle 10 can determine the position of the user 60 by using a gesture of the user 60. In a specific example, upon reception of the load 80 from the drone 40, the control device 11 of the vehicle 10 can cause the display 15, disposed inside the vehicle, to provide an indication (i) notifying that the load 80 has arrived and (ii) urging the user 60 who has ordered the load 80 to raise his/her hand. Such an indication may be, for example, an indication stating as follows: "The product of product number xx has arrived. The person who made this order, please raise your hand."

The control device 11 of the vehicle 10 detects, through known image analysis, the user 60's raising hand in an image captured by a camera in the vehicle. The user 60 who has raised his/her hand is the user who has ordered the load 80. Therefore, by detecting the raising-hand gesture, the control device 11 of the vehicle 10 can detect the position of the user 60 who has ordered the load 80.

Note that the gesture that the user 60 is urged to make is not limited to the raising-hand gesture, and may alternatively be another gesture such as a hand-waving gesture or a nodding gesture, for example.

According to another determining method, as shown in (2) of FIG. 13, the control device 11 of the vehicle 10 can determine the position of the user 60 by using a sound from the user 60. In a specific example, upon reception of the load 80 from the drone 40, the control device 11 of the vehicle 10 can cause the display 15, disposed inside the vehicle, to provide an indication (i) notifying that the load 80 has arrived and (ii) urging the user 60 who has ordered the load 80 to make a sound. Such an indication may be, for example, an indication stating as follows: "The product of product number xx has arrived. The person who made this order, please let us know by a sound."

In response to this, assume that the user 60 who sees the indication on the display 15 says "Yes". The control device 11 of the vehicle 10 detects the user 60's reply by a microphone in the vehicle, and determines a position of the sound source through known sound analysis. The position of the sound source is also the position of the user 60. Thus, determining the position of the sound source leads to determination of the position of the user 60.

According to another determining method, as shown in (3) of FIG. 13, the control device 11 of the vehicle 10 can determine the position of the user 60 by using button operation made by the user 60. In a specific example, upon reception of the load 80 from the drone 40, the control device 11 of the vehicle 10 can cause the display 15, disposed inside the vehicle, to provide an indication (i) notifying that the load 80 has arrived and (ii) urging the user 60 who has ordered the load 80 to press a button provided to the seat 60A. Such an indication may be, for example, an indication stating as follows: "The product of product number xx has arrived. The person who made this order, please press the button on the seat."

When the user 60 presses the button provided to the seat 60A, a signal indicating that the button has been pressed is transmitted to the control device 11 of the vehicle 10. By receiving this signal, the control device 11 of the vehicle 10 can acknowledge that the user 60 who has ordered the load 80 sits on the seat 60A. A position of the seat 60A on which the user 60 sits can be rephrased as the position of the user 60. Thus, determining the seat 60A on which the user 60 sits means determining the position of the user 60.

Note that the button provided to the seat 60A may be a physical button or an imaginary button.

According to another determining method, as shown in (4) of FIG. 13, when placing an order, the user 60 may be asked to input a seat number of the seat 60A on which the user 60 sits. The control device 11 of the vehicle 10 can determine the position of the user 60 by using the information of the seat number. For example, in a case of the example order shown in FIG. 12, when the user 60 orders a hamburger set, the user 60 is asked to input the seat number of the seat 60A on which the user 60 sits. The method for inputting the seat number is not particularly limited. However, it is preferable to employ a method according to which the user 60 can carry out an input operation, for example, a method according to which the user 60 is asked to select, on an image expressing the seats in the vehicle, the seat on which the user 60 sits.

According to another determining method, as shown in (5) of FIG. 13, the control device 11 of the vehicle 10 can determine the position of the user 60 by using an order screen used to make an order. In a specific example, the control device 11 of the vehicle 10 captures, by the camera in the vehicle, a screen of the user terminal 70 operated by the user 60. Through known image analysis on the image captured by the camera, the control device 11 of the vehicle 10 can acknowledge that the user 60 is ordering a product through the food delivery service. For example, when an image of the order screen shown in FIG. 12 is captured by the camera, the control device 11 of the vehicle 10 can acknowledge that the user 60 is ordering the product through the food delivery service.

After a given period of time has elapsed since the user 60 ordered the product, the drone 40 carries the load 80 to the vehicle 10. Thus, when the drone 40 carries the load 80 to the vehicle 10 after a given period of time has elapsed since the control device 11 of the vehicle 10 acknowledged the order made by the user 60, the control device 11 of the vehicle 10 can acknowledge that the load 80 is the product ordered by the user 60. According to this method, at the time point when the control device 11 of the vehicle 10 acknowledges that the user 60 is ordering the product, the control device 11 of the vehicle 10 can determine the position of the user 60 on the basis of the image obtained by the camera. Therefore, when the load 80 arrives at the vehicle 10, the control device 11 of the vehicle 10 may use the position of the user 60 which position has been already determined.

According to another determining method, as shown in (6) of FIG. 13, the control device 11 of the vehicle 10 can determine the position of the user 60 by using Bluetooth (registered trademark). Assume that the user terminal 70 owned by the user 60 and the seats in the vehicle 10 can carry out communication by using Bluetooth (registered trademark). Assume also that the user terminal 70 owned by the user 60 and the seat 60A on which the user 60 sits are paired with each other through Bluetooth (registered trademark). Further, assume that the control device 11 of the vehicle 10 knows the positions of the seats in the vehicle 10.

When the user 60 orders a product via the Internet, information relating to the order and identification information of the user terminal 70 owned by the user 60 are transmitted to the first management server 20. Examples of the identification information of the user terminal 70 include an identification number generated by Operating System (OS), representative examples of which include Unique Device IDentifier (UDID), a terminal identification ID (International Mobile Equipment Identifier (IMEI)), a subscriber identification ID (International Mobile Subscriber Identity (IMSI)), and MAC address. The identification information of the user terminal 70 is transmitted from the first management server 20 to the control device 11 of the vehicle 10 via the second management server 30.

Upon reception of the load 80 from the drone 40, the control device 11 of the vehicle 10 identifies, among the communication devices paired with the seats through Bluetooth (registered trademark), a communication device having the identification information associated with the information relating to the order. Here, the communication device having the identification information associated with the information relating to the order is the user terminal 70. The user terminal 70 is paired with the seat 60A through Bluetooth (registered trademark). Thus, the control device 11 of the vehicle 10 can acknowledge that the user terminal 70 was used to order the load 80 and the seat on which the user 60 owing the user terminal 70 sits is the seat 60A, thereby determining the position of the user 60.

Note that each of the methods (1) to (6) described with reference to FIG. 13 may be used solely. Alternatively, any of these methods may be used in combination or all of these methods may be used in combination.

In step S112, the control device 11 of the vehicle 10 determines whether or not delivery of the load 80 to the user 60 is possible. On the basis of a traveling state or a traveling environment of the vehicle 10, the control device 11 of the vehicle 10 can determine whether or not delivery of the load 80 to the user is possible. One example of the traveling state of the vehicle 10 may be an acceleration of the vehicle 10. In a specific example, in a case where the acceleration of the vehicle 10 is less than 0.3 G, the control device 11 of the vehicle 10 determines that delivery of the load 80 to the user is possible. Meanwhile, in a case where the acceleration of the vehicle 10 is not less than 0.3 G, the control device 11 of the vehicle 10 determines that delivery of the load 80 to the user is impossible. The reason is that, in the case where the acceleration of the vehicle 10 is not less than 0.3 G, there is a possibility that the user 60 cannot receive the load 80 well and the food and drink may spill in the vehicle. Note that the numerical value "0.3 G" is one example, and can be changed as appropriate. In place of the acceleration, a deceleration or a speed may be used by the control device 11 of the vehicle 10 to determine whether or not delivery of the load 80 to the user is possible.

One example of the traveling environment of the vehicle 10 may be a road where the vehicle 10 is traveling. In a specific example, in a case where the road where the vehicle 10 is traveling is a sharp curve or a steep slope, the control device 11 of the vehicle 10 determines that delivery of the load 80 to the user is impossible. Further, in a case where the road where the vehicle 10 is traveling is a bad road, the control device 11 of the vehicle 10 may determine that delivery of the load 80 to the user is impossible. The reason is that, in the case where the vehicle 10 is traveling on the sharp curve or bad road, there is a possibility that the user 60 cannot receive the load 80 well and the food and drink may spill in the vehicle. Examples of the "bad road" include a Belgian block road, a corrugated road, a gravel road, and the like.

Meanwhile, in a case where the road where the vehicle 10 is traveling is a straight, flat paved road, the control device 11 of the vehicle 10 determines that delivery of the load 80 to the user is possible. The control device 11 of the vehicle 10 can determine, on the basis of an image captured by the camera 13, what kind of road the vehicle 10 is traveling.

Further, by using both the traveling state condition and the traveling environment condition of the vehicle 10, the control device 11 of the vehicle 10 may determine whether or not delivery of the load 80 to the user is possible. For example, in a case where the acceleration of the vehicle 10 is less than 0.3 G and the road where the vehicle 10 is traveling is a straight, flat paved road, the control device 11 of the vehicle 10 may determine that delivery of the load 80 to the user is possible.

If the determination result in step S112 is "YES", the process advances to step S113. Then, the control device 11 of the vehicle 10 causes the ceiling module 16 to move to the position of the user 60 determined in the process in step S111 (see FIG. 3).

The process advances to step S114. Then, the user 60 receives the load 80 from the ceiling module 16 (see FIG. 3).

The process advances to step S115. Then, after delivery of the load 80 to the user 60 is completed, the control device 11 of the vehicle 10 causes the ceiling module 16 to a given position. There is no particular limitation on the "given position". Preferably, the "given position" is a position which does not hinder viewing of the display 15, for example. A specific example of such a position is a rear end of the vehicle 10.

If the determination result in step S112 is "NO", the process advances to step S119. Then, the control device 11 of the vehicle 10 calculates a timing suitable for delivery of the load 80. In a specific example, in a case where the vehicle 10 is traveling on a sharp curve, the control device 11 of the vehicle 10 calculates, as the timing for delivering the load 80, a timing after the vehicle passes the sharp curve. In a case where the acceleration of the vehicle 10 is not less than 0.3 G, the control device 11 of the vehicle 10 may calculate, as the timing for delivering the load 80, a timing when the acceleration of the vehicle 10 becomes less than 0.3 G. The control device 11 of the vehicle 10 causes the ceiling module 16 to move at the timing thus calculated (step S113).

In a case where a plurality of loads are delivered by the drone 40 at the same time, the control device 11 of the vehicle 10 may determine positions of users who have ordered the respective loads and then deliver the loads in order. Regarding the order of delivering the loads, the control device 11 of the vehicle 10 can deliver the loads in an increasing order of a distance from the ceiling module 16 to a user, for example.

The flow of the processes described with reference to FIGS. 10 and 11 is merely an example. An unnecessary step(s) may be eliminated, a new step(s) may be added, or the order of the steps may be changed, without departing from the scope of the present disclosure. For example, some users may wish to receive the load 80 immediately after arrival of the load 80. In this case, the process in step S112 may be omitted. [Variations]

Next, the following description will discuss a variation of the first embodiment. In the description in the first embodiment, the ceiling module 16 is caused to move to the position of the user 60 who has ordered the load 80. Note, however, that the user who wishes to receive the load 80 is not limited to the user 60 himself/herself, who has ordered the load 80. There may be a case where a user who is not the user 60 who has ordered the load 80 wishes to receive the load 80. One example of such a case may be a case where the user who is not the user 60 makes an order in the place of the user 60.

In the variation, a user who has ordered the load 80 is assumed as the user 60 and a user who wishes to receive the load 80 is assumed as the user 61. Upon reception of the load 80 from the drone 40, the control device 11 of the vehicle 10 needs to determine a position of the user 61 who wishes to receive the load 80. One example of the method for determining the position of the user 61 who wishes to receive load 80 may be a method that uses a gesture of the user 61, as described with reference to (1) of FIG. 13.

In a specific example, upon reception of the load 80 from the drone 40, the control device 11 of the vehicle 10 can cause the display 15, disposed inside the vehicle, to provide an indication (i) notifying that the load 80 has arrived and (ii) urging the user 61 who wishes to receive the load 80 to raise his/her hand. Such an indication may be, for example, an indication stating as follows: "The product of product number xx has arrived. The person who wishes to receive the product, please raise your hand." By detecting user 61's raising-hand, the control device 11 of the vehicle 10 can detect the position of the user 61 who wishes to receive the load 80.

As discussed with reference to (2) and (3) of FIG. 13, the position of the user 61 who wishes to receive the load 80 may be determined by using, instead of the gesture, a sound or operation of a button provided to the seat. Further, with regard to the seat number discussed with reference to (4) of FIG. 13, the user 60 may input, as information of a destination of the product, the seat number of the seat 61A on which the user 61 sits when the user 60 makes the order. Consequently, the control device 11 of the vehicle 10 can determine the position of the user 61 by using the information of the seat number.

The control device 11 of the vehicle 10 causes the ceiling module 16 to move to the position of the user 61 determined in this manner. This makes it possible to deliver the load 80 to the user 61 who wishes to receive the load 80.
(Effects)

As discussed above, the first embodiment provides the following effects.

The control device 11 of the vehicle 10 is a control device, provided to the ceiling of the vehicle 10, for controlling the ceiling module 16 movable in the ceiling. The control device 11 of the vehicle 10 determines, on the basis of given information, a position of a user relating to the load 80 placed on the ceiling module 16, and causes the ceiling module 16 to move to the determined position.

With the above configuration, it is possible to deliver the load 80 to the user relating to the load 80. Further, since the load 80 is automatically delivered by the ceiling module 16, the user can receive the load 80 without leaving the seat. The "user relating to the load 80" may be the user 60 who has ordered the load 80 or the user 61 who wishes to receive the load 80.

The description in the first embodiment has discussed the vehicle 10 as an example. Alternatively, the present disclosure is applicable also to moving bodies such as airplanes and ships, provided that the ceiling module 16 can be attached thereto. For example, the present disclosure may be applied to an airplane to allow a flight attendant to provide an in-flight meal, which is an in-flight service, to a passenger, without facing the passenger.

Note that a "controller" is hardware including at least a CPU 11a and a memory 11c. The CPU 11a reads out and executes a program stored in the memory 11c, and executes the processes discussed with reference to FIGS. 10 and 11.

Further, the control device 11 of the vehicle 10 may determine, on the basis of given information, the position of the user 60 who has ordered the product while traveling in the vehicle 10. The control device 11 of the vehicle 10 may cause the ceiling module 16 to move to the determined position while the vehicle 10 is traveling toward a destination.

The above configuration allows the user 60 to receive the product while the user 60 is traveling. This can contribute to increase in demand for shopping or demand for restaurants during traveling.

Further, the given information may include at least one of image information obtained by capturing an image of a gesture of the user 60, sound information of the user 60, signal information indicative of a signal transmitted from an input device which is provided to the seat 60A on which the user 60 sits and which accepts an input from the user 60, order information associated with the seat number of the seat 60A on which the user 60 sits, image information obtained by capturing an image of a screen while the user 60 is ordering a product via the screen, and identification information of the user terminal 70 that is owned by the user 60 and that is paired with, through Bluetooth (registered trademark), the seat 60A on which the user 60 sits.

With the above configuration, it is possible to determine the position of the user 60 with high accuracy. Thus, it is possible to deliver the load 80 to the user 60. Note that one example of the "input device which accepts an input from the user 60" is the above-mentioned button.

Further, the control device 11 of the vehicle 10 may determine, on the basis of at least one of a traveling state of the vehicle 10 and a traveling environment of the vehicle 10, whether or not movement of the ceiling module 16 is possible while the vehicle 10 is traveling toward a destination.

Depending on the traveling state of the vehicle 10 and/or the traveling environment of the vehicle 10, there is a possibility that the user 60 cannot receive the load 80 well and food and drink may spill in the vehicle. In order to deal with this, movement of the ceiling module 16 may be restricted depending on the situation. This can prevent such a situation.

Further, on the basis of at least one of the traveling state of the vehicle 10 and the traveling environment of the vehicle 10, the control device 11 of the vehicle 10 may make at least one of (i) determination of whether or not movement of the ceiling module 16 is possible while the vehicle 10 is traveling toward a destination and (ii) determination of whether or not the user 60 becomes able to receive the product from the ceiling module 16.

Further, in a case where the control device 11 of the vehicle 10 determines that movement of the ceiling module 16 is impossible, the control device 11 of the vehicle 10 may calculate, on the basis of at least one of the traveling state of the vehicle 10 and the traveling environment of the vehicle 10, a timing when movement of the ceiling module 16 is possible while the vehicle 10 is traveling toward the destination.

With the above configuration, it is possible to deliver the load 80 to the user 60 at a timing when the user 60 can easily receive the load 80.

Further, in a case where the control device 11 of the vehicle 10 determines that movement of the ceiling module 16 is impossible or in a case where the control device 11 of the vehicle 10 determines that the user 60 is not able to receive the product from the ceiling module 16, the control device 11 of the vehicle 10 may calculate, on the basis of at least one of the traveling state of the vehicle 10 and the traveling environment of the vehicle 10, a timing when movement of the ceiling module 16 becomes possible while the vehicle 10 is traveling toward the destination or a timing when the user 60 becomes able to receive the product from the ceiling module 16.

The control device 11 of the vehicle 10 may cause the opening/closing device 17, which is provided to the roof of the vehicle 10 and which can open and close the opening 81 of the roof, to slide so as to open the opening 81 of the roof, and may cause the ceiling module 16 to move toward the opening 81 of the roof so that the ceiling module 16 reaches a position in which the drone 40 carrying the load 80 can place the load 80 on the ceiling module 16.

With the above configuration, the drone 40 can receive the load 80 even during traveling.

In the foregoing description, the ceiling module 16 provided to the ceiling of the vehicle 10 is described as a module movable in the inside of the vehicle 10. However, this is not limitative. The module movable in the inside of the vehicle 10 may be, for example, a module movable over a floor surface of the vehicle 10. Alternatively, the module may be a module that is provided to an exterior surface of the vehicle 10 and that is movable in the inside of an attachment such as a roof box. In the foregoing description, the "inside of the vehicle 10" is described as an "interior of the vehicle 10". However, this is not limitative. In a case where the attachment is provided on the exterior surface of the vehicle 10, the "inside of the vehicle 10" may include the "interior of the vehicle 10" and the "inside of the attachment provided to the exterior surface of the vehicle 10". Note that the inside of the attachment provided to the exterior surface of the vehicle 10 is a non-residential space.

Second Embodiment

Figure 14:
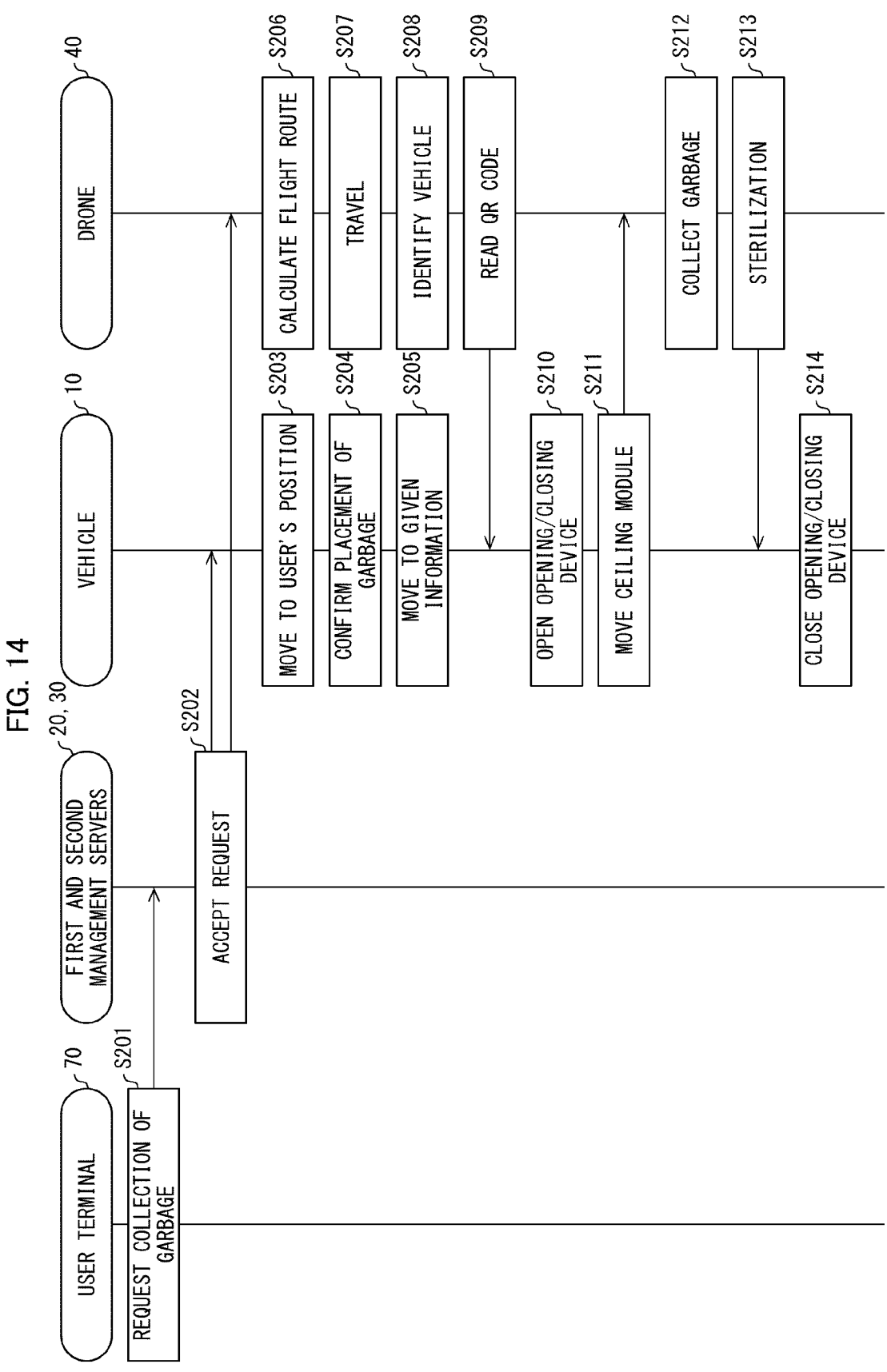
FIG. 14 is a sequence chart illustrating a flow of a process of collecting garbage.

Next, the following description will discuss a second embodiment of the present disclosure with reference to FIG. 14. In the second embodiment, assume that the product ordered, via the Internet, by the user 60 who is traveling in the vehicle 10 is food and drink. The user 60 receives and eats the ordered food and drink while traveling. Since the user 60 is traveling in the vehicle 10, the user 60 is required to collect and appropriately deal with garbage (e.g., wrapping paper, a plastic container, and/or raw garbage such as food leftovers) involved in the food and drink after the user 60 arrives at a destination. However, in some cases, the garbage may be left in the vehicle, e.g., for the reason that the user forgets that. In such a case, the business operator that operates the ridesharing service needs to dispose of the garbage, which requires time and cost. In order to deal with this, the second embodiment employs a configuration that collects the garbage by using the drone 40.

FIG. 14 is a sequence chart illustrating a flow of a process of collecting garbage. In step S201, the user 60 who is traveling in the vehicle 10 uses an application 741 to request collection of garbage (e.g., wrapping paper, a plastic container, and/or raw garbage such as food leftovers) involved in the food and drink. The information relating to the request from the user 60 is transmitted to the first management server 20. Note that the garbage that the user 60 can request collection may be limited to the garbage involved in the food and drink ordered by the user 60 during traveling.

In step S202, the first management server 20 obtains the: information n relating to the request transmitted in the process in step S201 so as to accept the request from the user 60. The first management server 20 transmits the information relating to the accepted request and the information relating to the ridesharing service to the second management server 30. Note that, in FIG. 13, the first management server 20 and the second management server 30 are not separated from each other for want of space in the drawing. The second management server 30 transmits the information relating to the request and the information relating to the ridesharing service to the control device 41 of the drone 40 and the control device 11 of the vehicle 10. Consequently, the control device 41 of the drone 40 can acknowledge a position of the vehicle 10 which is a destination to collect the garbage and a manufacturer name and a model name of the vehicle 10. With regard to the drone 40 used to collect the garbage, a drone that is being on standby at a location near a place where the vehicle 10 is traveling may be selected, for example.

In step S203, the control device 11 of the vehicle 10 determines, on the basis of the information obtained from the second management server 30, a position of the user 60 who has requested collection of the garbage, and causes the ceiling module 16 to move to the determined position of the user 60. The position of the user 60 who has requested collection of the garbage can be determined by a similar method to the method described with reference to FIG. 13.

In step S204, the control device 11 of the vehicle 10 confirms, with use of the camera in the vehicle, that the user 60 has put the garbage on the ceiling module 16.

In step S205, the control device 11 of the vehicle 10 causes the ceiling module 16 to move to a given position. There is no particular limitation on the "given position". For example, the "given position" is preferably a position where the garbage can be passed to the drone 40 immediately after arrival of the drone 40. Specific example of such a position is a rear end of the vehicle 10.

In step S206, the control device 41 of the drone 40 calculates, on the basis of the information received from the second management server 30, a flight route to the vehicle 10.

In step S207, the control device 41 of the drone 40 causes the drone 40 to fly along the flight route calculated in the process in step S206.

The contents of the processes in steps S208 to S211 are identical to those of the processes in steps S105 to S108 described with reference to FIG. 10. Therefore, descriptions thereof will be omitted.

In step S212, after confirming the movement of the ceiling module 16 by the camera 43, the control device 41 of the drone 40 controls the arms 46 to collect the garbage.

In step S213, the control device 41 of the drone 40 causes a spray can or the like provided to the drone 40 to inject a disinfectant over the ceiling module 16 for sterilization.

In step S214, the control device 11 of the vehicle 10 causes the ceiling module 16 to move to the inside of the vehicle, and causes the opening/closing device 17 to slide toward the rear side of the vehicle 10 so as to close the opening 81.

(Effects)

As discussed above, the second embodiment provides the following effects.

The control device 11 of the vehicle 10 determines, on the basis of given information, a position of the user 60 who has requested collection of garbage involved in a product, and causes the ceiling module 16 to move to the determined position while the vehicle 10 is traveling toward a destination.

The above configuration allows the user 60 to dispose of the garbage while the user 60 is traveling. Thus, the user does not need to carry and dispose of the garbage after arriving at the destination. Further, the garbage would not be left in the vehicle. Thus, the business operator operating the ridesharing service does not need to dispose of the garbage.

Software Implementation Example

The function as the control device 11 of the vehicle 10 can be realized by a program causing a computer to function as the control device 11, the program causing the computer to function as the control blocks of the control device 11.

In this case, the control device 11 of the vehicle 10 includes a computer including at least one device (e.g., a processor) and at least one storage device (e.g., a memory) as hardware for executing the program. The computer executes the program to realize the functions described in the foregoing embodiments. The program may be stored in one or more non-transitory, computer-readable storage media. The one or more storage media may or may not be included in the control device 11 of the vehicle 10. In the latter case, the program can be supplied to the control device 11 via any wired or wireless transmission medium.

Some or all of the functions of the control blocks can be realized by a logic circuit. For example, an integrated circuit in which a logic circuit that functions as the control blocks is formed is also encompassed in the scope of the present disclosure. In addition, the function of the control blocks can be realized by, for example, a quantum computer.

Further, each of the processes described in the foregoing embodiments can be executed by artificial intelligence (AI). In this case, the AI may be operated by the control device 11 of the vehicle 10 or may be operated by another device (for example, an edge computer or a cloud server).

The present disclosure is not limited to the embodiments, but can be altered by a skilled person in the art within the scope of the claims. The present disclosure also encompasses, in its technical scope, any embodiment derived by combining technical means disclosed in differing embodiments.

REFERENCE SIGNS LIST

100: delivery management system
10: vehicle
11: control device
16: ceiling module
40: drone
60A: seat
80: load

The invention claimed is:

1. A control device that controls a module which is provided to a vehicle and which is movable in an inside of the vehicle, the control device comprising:

a memory; and a processor that, in cooperation with the memory, performs operations including:

determining, on a basis of given information, a position of a seat on which a user sits, the user relating to a product placed on the module, wherein the module is provided to a ceiling of the vehicle and is movable inside the vehicle along a rail provided to the ceiling of the vehicle, the module has a box-shaped configuration that enables the product to be placed thereon, and the processor, in cooperation with the memory, further performs operations including:

causing, based on a signal transmitted from a drone that carries the product, an opening/closing device, which is provided to a roof of the vehicle and is capable of opening and closing an opening of the roof, to slide so as to open the opening of the roof, causing the module to move toward the opening of the roof so that the module reaches a position in which the drone carrying the product is capable of placing the product on the module, and causing the module to move along the rail to the determined position of the seat.

2. The control device according to claim 1, wherein:

the product is a product ordered by the user who is traveling in the vehicle;

the processor determines, on a basis of the given information, the position of the seat of the user who has ordered the product; and the processor causes the module to move to the determined position of the seat while the vehicle is traveling toward a destination.

3. The control device according to claim 2, wherein:

the given information includes at least one of image information obtained by capturing an image of a gesture of the user, sound information of the user, signal information indicative of a signal transmitted from an input device which is provided to a seat on which the user sits and which accepts an input from the user, order information associated with a seat number of the seat on which the user sits, image information obtained by capturing an image of a screen while the user is ordering the product via the screen, and identification information of a user terminal that is owned by the user and that is paired with, through Bluetooth (registered trademark), the seat on which the user sits.

4. The control device according to claim 2, wherein:

on a basis of at least one of a traveling state of the vehicle and a traveling environment of the vehicle, the processor makes at least one of (i) determination of whether or not movement of the module is possible while the vehicle is traveling toward the destination and (ii) determination of whether or not the user is able to receive the product from the module.

5. The control device according to claim 4, wherein:

in a case where the processor determines that movement of the module is impossible or in a case where the processor determines that the user is not able to receive the product from the module, the processor calculates, on a basis of at least one of the traveling state of the vehicle and the traveling environment of the vehicle, a timing when movement of the module becomes possible while the vehicle is traveling toward the destination or a timing when the user becomes able to receive the product from the module.

6. The control device according to claim 2, wherein:

the processor determines, on a basis of the given information, the position of the seat of the user who has requested collection of garbage involved in the product; and the processor causes the module to move to the determined position of the seat while the vehicle is traveling toward the destination.

7. A control method used for a control device that controls a module which is provided to a vehicle and which is movable in an inside of the vehicle, the control method comprising:

determining, on a basis of given information, a position of a seat on which a user sits, the user relating to a product placed on the module, wherein the module is provided to a ceiling of the vehicle and is movable inside the vehicle along a rail provided to the ceiling of the vehicle, the module has a box-shaped configuration that enables the product to be placed thereon, and the control method further comprises:

causing, based on a signal transmitted from a drone that carries the product, an opening/closing device, which is provided to a roof of the vehicle and is capable of opening and closing an opening of the roof, to slide so as to open the opening of the roof;

causing the module to move toward the opening of the roof so that the module reaches a position in which the drone carrying the product is capable of placing the product on the module; and causing the module to move along the rail to the determined position of the seat.

8. A non-transitory computer-readable storage medium having a control program stored therein, the control program causing a computer to execute:

determining, on a basis of given information, a position of a seat on which a user sits in a vehicle, the user relating to a product placed on a module, wherein the module is provided to a ceiling of the vehicle, is movable in an inside of the vehicle along a rail provided to the ceiling of the vehicle and has a box-shaped configuration that enables the product to be placed thereon;

causing, based on a signal transmitted from a drone that carries the product, an opening/closing device, which is provided to a roof of the vehicle and is capable of opening and closing an opening of the roof, to slide so as to open the opening of the roof;

causing the module to move toward the opening of the roof so that the module reaches a position in which the drone carrying the product is capable of placing the product on the module; and causing the module to move along the rail to the determined position of the seat.

* * * * *